(12) United States Patent
Jeon

(10) Patent No.: US 10,934,111 B2
(45) Date of Patent: Mar. 2, 2021

(54) CARGO LOADING SYSTEM

(71) Applicant: Hyeon Cheol Jeon, Yangsan-si (KR)

(72) Inventor: Hyeon Cheol Jeon, Yangsan-si (KR)

( * ) Notice: Subject to any disclaimer, the term of this patent is extended or adjusted under 35 U.S.C. 154(b) by 70 days.

(21) Appl. No.: 16/478,355

(22) PCT Filed: Feb. 13, 2018

(86) PCT No.: PCT/KR2018/001864
§ 371 (c)(1),
(2) Date: Jul. 16, 2019

(87) PCT Pub. No.: WO2018/169218
PCT Pub. Date: Sep. 20, 2018

(65) Prior Publication Data
US 2019/0367299 A1 Dec. 5, 2019

(30) Foreign Application Priority Data
Mar. 16, 2017 (KR) .................. 10-2017-0032930

(51) Int. Cl.
*B65G 67/20* (2006.01)
*B60P 1/64* (2006.01)
*B60P 7/13* (2006.01)

(52) U.S. Cl.
CPC ............... *B65G 67/20* (2013.01); *B60P 1/64* (2013.01); *B60P 7/13* (2013.01)

(58) Field of Classification Search
CPC .. B60P 1/4435; B60P 1/64; B60P 1/02; B60P 1/36; B65G 7/02; B65G 7/04; B65G 7/20
See application file for complete search history.

(56) References Cited

FOREIGN PATENT DOCUMENTS

| JP | H11-500095 A | 1/1999 |
|---|---|---|
| JP | 2007-001745 A | 1/2007 |
| JP | 2012-016985 A | 1/2012 |
| JP | 2013-095539 A | 5/2013 |
| KR | 10-1549365 B1 | 9/2015 |
| KR | 10-1710031 B1 | 3/2017 |

*Primary Examiner* — Saul Rodriguez
*Assistant Examiner* — Willie Berry, Jr.
(74) *Attorney, Agent, or Firm* — KORUS Patent, LLC; Seong Il Jeong

(57) ABSTRACT

The present invention relates to a cargo loading system. The cargo loading system includes: a frame; a plurality of height adjustment devices which is formed on the top surface of the frame; a support plate which is disposed on the tops of the plurality of height adjustment devices; a second guide rail which k disposed on the top surface of the support plate; a connection device which connects an end of a first guide rail formed on the loading part of a transportation device; a fastening device which is coupled to an end of the loading part; a movable body which is provided with driving rollers; a drive device which k disposed on the rear side of the support plate; a fastening plate which is disposed on the movable body; and a guide line which is disposed adjacent to the second guide rail.

6 Claims, 9 Drawing Sheets

CARGO LOADING SYSTEM

TECHNICAL FIELD

The present invention relates to a cargo loading system for facilitating the work of loading and unloading cargo into and from the cargo box of a transportation vehicle such as a cargo vehicle or freight train, which enables the work of loading cargo into the entrance of a cargo box, moving the cargo to a required location and placing the cargo at the required location and the work of unloading the cargo loaded into the cargo box to be easily performed.

BACKGROUND ART

With the development and advancement of the industry, there is a tendency for various types of risks, contamination and disgusting materials in transportation and loading to be generated and increased. Due to contamination, odor, and esthetic problems concerning the transportation of such materials, regulations requiring enclosed transportation are successively enforced in many countries over the world, but there is no actual alternative unless cargo is loaded into a cargo box such as a container box.

In particular, cargo, such as various types of waste materials, scraps including metal scraps, and waste paper, has to be transported by means of an enclosed cargo box.

Generally, in regards to a means for transporting such cargo, when a transportation means, such as a cargo vehicle or box truck, is used, cargo cannot be vertically loaded into a cargo box by a crane due to the roof of the cargo box of the transportation vehicle. Accordingly, cargo needs to be loaded into the cargo box of a transportation vehicle and then to be moved deep into the inside of the cargo box. When it is necessary to unload the cargo loaded into the cargo box, the cargo is pulled into the entrance and unloaded by using a forklift or the like.

The conventional work of loading and unloading cargo into and from the cargo boxes of transportation means is performed using various methods. In examples thereof, the following means are provided.

Cargo to be transported is loaded onto the entrance of a cargo box by using a cargo loading means, a worker climbs into the cargo box in the state, pushes the cargo to a required location, and places the cargo, and the same work is repeated in order to load another piece of cargo.

Furthermore, when it is necessary to unload cargo loaded into a cargo box, a worker climbs into the cargo box, pulls the cargo to an entrance and then unloads the cargo from the cargo box.

However, the above-described cargo loading means is disadvantageous in that work is burdensome because a worker needs to directly enter the cargo box and to push or pull the cargo to a required location. In particular, the above-described cargo loading means is disadvantageous in that loading and unloading work is difficult to perform and a lot of manpower is required in the case where the location at which a vehicle is stopped is inclined.

DISCLOSURE

Technical Problem

The present invention has been conceived to overcome the above-described problems, and an object of the present invention is to enable cargo to be loaded into and unloaded from a cargo box regardless of the stopping location of a transportation means, to enable cargo to be moved and loaded deep into a sealed cargo box through simple external operation without requiring a worker to enter the cargo box, and to enable cargo loaded into the sealed cargo box to be moved to an entrance and unloaded, thereby enabling the work of loading and unloading cargo to be rapidly and easily performed.

Technical Solution

According to the present invention, there is provided a cargo loading system including: a frame which is installed on a ground surface; a plurality of height adjustment means which is formed on the top surface of the frame; a support plate which is disposed on the tops of the plurality of height adjustment means; a second guide rail which is disposed on the top surface of the support plate so as to correspond to a first guide rail formed on the loading part of a transportation means; a connection means which is disposed at an end of the second guide rail and connects an end of the first guide rail; a fastening means which is disposed on the front side of the support plate and is coupled to an end of the loading part; a movable body which is provided with driving rollers on the bottom thereof so that it can move along the first guide rail and the second guide rail and is loaded with cargo on the top thereof; a drive means which is disposed on the rear side of the support plate so as to move the movable body along the first guide rail and the second guide rail and includes a wire configured to be connected to one side of the movable body, a winding unit configured to wind the wire, and a drive motor configured to drive the winding unit; a fastening plate which is disposed on the movable body; and a guide line which is disposed adjacent to the second guide rail so as to be coupled to the fastening plate through a locking member.

In this case, the front side of the second guide rail is formed as an inclined surface which rises gradually.

In this case, the connection means includes a coupling pin configured to pass through a first through hole formed at an end of the first guide rail and a second through hole formed at one end of the connection body and thus performs fastening, and a coupling pin configured to pass through a third through hole formed at an end of the second guide rail and a fourth through hole formed at the other end of the connection body and thus performs fastening.

In addition, the fastening means includes a fastening ring configured to be attached to an end of the support plate, a first fastening rod configured to be hinged to the fastening ring, a turnbuckle configured such that universal joints are coupled to both ends thereof and one end thereof is coupled to the first fastening rod, and a second fastening rod configured such that the other end of the turnbuckle is coupled thereto and a through hole is formed at an end thereof.

Furthermore, the fastening plate is provided with a fastening hole and coupled to a side surface of the movable body via a fastening bolt, and is provided with an elongated hole in the longitudinal direction thereof so that the locking member can be accommodated in the elongated hole; fastening members protrude from a side surface of the guide line in a predetermined arrangement so as to accommodate the locking member, and a first fastening pin hole configured such that a fastening pin is coupled thereinto is formed through a side surface of each of the fastening members; and the locking member passes through the elongated hole and the fastening member, a second fastening pin hole corresponding to the first fastening pin hole is formed through a side surface of the locking member, and the fastening pin passes through the holes and thus performs fastening.

Moreover, the drive means is configured such that a rotating shaft is disposed adjacent to the first guide rail, a guide shaft is disposed adjacent to the second guide rail, and the wire is connected to one side of the movable body via the guide shaft and the rotating shaft.

Advantageous Effects

In the cargo loading system according to the present invention, the height adjustment means are disposed on the top of the frame installed on a ground surface, and thus effects are achieved in that cargo can be prevented from sliding and falling even in a state in which a cargo box is inclined by the height adjustment means and in that a height can be made level with a transportation means, and thus the cargo can be safely loaded and unloaded regardless of the stopping location of the transportation means.

Furthermore, cargo can be loaded deep into the cargo box by using the movable body disposed to be movable along the first guide rails and the second guide rails and loaded cargo can be simply moved to an entrance, and thus the effect of being convenient is achieved in that cargo can be loaded and unloaded only by simple operation from the outside without requiring a worker to enter the cargo box when the worker wants to load and unload the cargo into and from the cargo box.

| 100: frame | 200: height adjustment means |
|---|---|
| 300: support plate | 400: first guide rails |
| 450: second guide rails | 500: connection means |
| 550: fastening means | 600: movable body |
| 700: drive means | 710: wire |
| 720: winding unit | 730: drive motor |
| 740: rotating shaft | 800: fastening plate |
| 900: guide lines | 910: locking member |

BEST MODE

The technical spirit of the present invention will be described more specifically below by using the accompanying drawings.

The accompanying drawings are merely examples which are illustrated to describe the technical spirit of the present invention more specifically, and thus the technical spirit of the present invention is not limited to the shapes of the accompanying drawings.

However, in the description of the present invention, descriptions of already well-known functions or configurations will be omitted in order to make the gist of the present invention clear.

Figure 1:
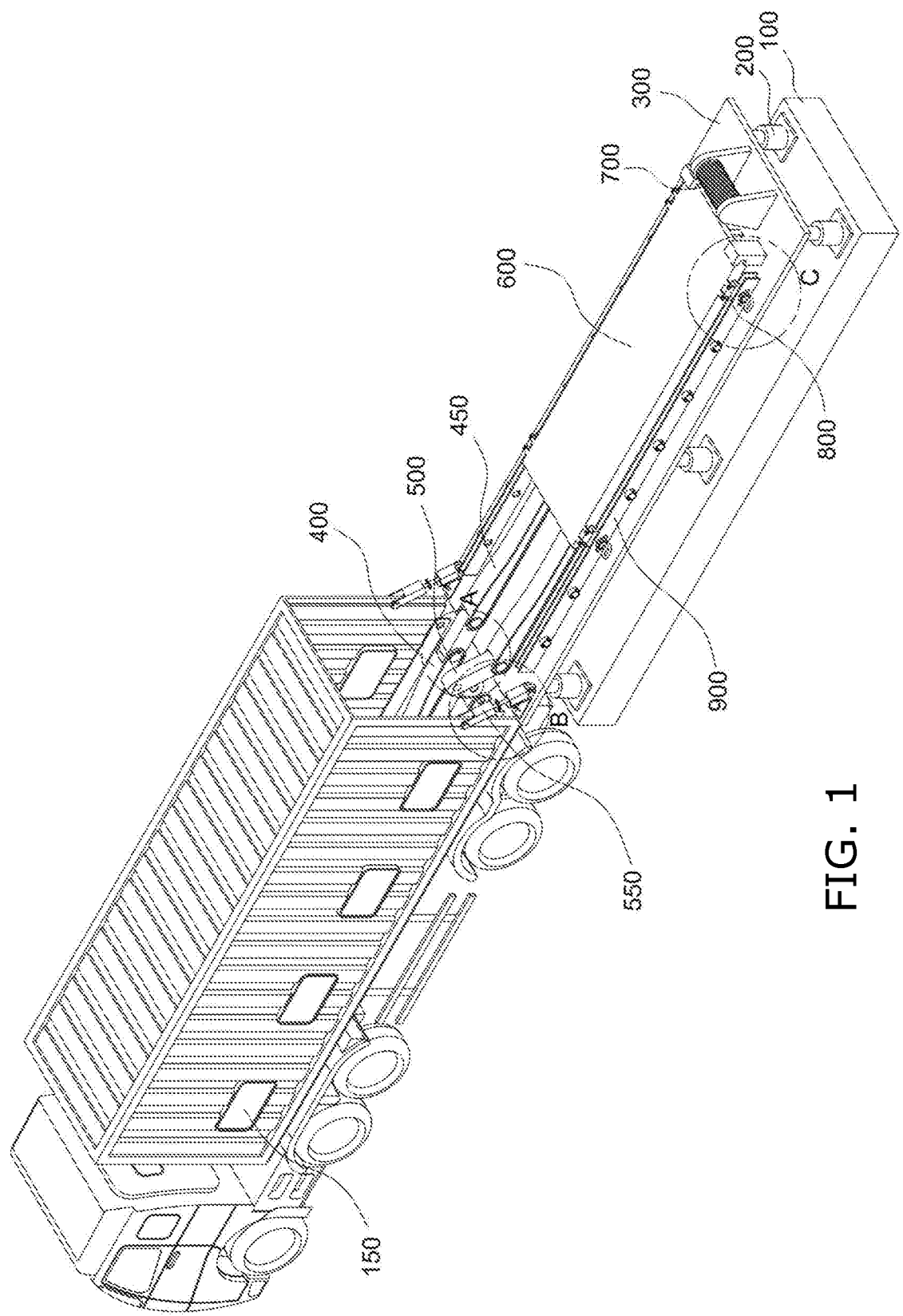
FIG. 1 is a perspective view showing an embodiment to which a cargo loading system according to the present invention is applied.

FIG. 1 is a perspective view showing an embodiment to which a cargo loading system according to the present invention is applied.

As shown in FIG. 1, the cargo loading system according to the present invention includes a frame 100, height adjustment means 200, a support plate 300, one or more first guide rails 400, one or more second guide rails 450, one or more connection means 500, one or more fastening means 550, a movable body 600, a drive means 700, a fastening plate 800, and one or more guide lines 900.

First, the frame 100 is securely installed so as to rub against a ground surface and not to move so that various types of cargo can be placed on the frame 100 and do not fall when the cargo is loaded into and unloaded from the cargo boxes of various types of transportation means.

The height adjustment means 200 include a plurality of height adjustment means 200 disposed on the top surface of the frame 100, and can adjust height so that the first guide rails 400 and the second guide rails 450, which will be described later, are connected in parallel because the heights of the loading parts of the various types of transportation means are different from each other. Although the height adjustment means 200 may be constructed in various forms, it is preferable that height adjustment means 200 are composed of cylinders which are operated by air or hydraulic pressure.

In this case, although the number of height adjustment means 200 which are disposed on the frame 100 varies depending on the size of the frame 100, six height adjustment means 200 are generally disposed and used. When necessary, the number of height adjustment means 200 may be increased or decreased.

Next, the support plate 300 is disposed on the tops of the plurality of height adjustment means 200. The plurality of height adjustment means 200 is adjusted in height and then fastened such that the support plate 300 is not inclined in any one direction.

The second guide rails 450 are arranged and disposed on the top surface of the support plate 300 in one row or a plurality of rows, and the first guide rails 400 are arranged and formed on the loading part of the transportation means in one row or a plurality of rows so as to correspond to the second guide rails 450. It is preferred that the front sides of the second guide rails 450 be formed as inclined surfaces which rise gradually.

Each of the connection means 500 which connects a corresponding one of the first guide rails 400 and a corresponding one of the second guide rails 450 is formed between the first guide rail 400 and the second guide rail 450. The connection means 500 is hinged to an end of the second guide rail 450, and is detachably coupled to an end of the first guide rail 400.

The fastening means 550 are disposed on the front of the support plate 300, and are coupled to the cargo box of the transportation means. The fastening means 550 fastens the transportation means and the support plate 300 to each other so that the connection means 500 can more firmly connect the first guide rail 400 and the second guide rail 450 to each other.

The movable body 600 is provided with driving rollers (not shown) on the bottom thereof so that it can move along the first guide rails 400 and the second guide rails 450. Cargo is placed on the top of the movable body 600. The cargo placed on the movable body 600 may be moved by the first guide rails 400 and then loaded into the cargo box of the transportation means, or the cargo placed on the first guide rails 400 may be moved by the second guide rails 450 and then unloaded.

The drive means 700 is disposed on the back side of the support plate 300 so that the movable body 600 can freely move along the first guide rails 400 and the second guide rails 450.

The drive means 700 includes a wire 710 configured to be connected to one side of the movable body 600, a winding unit 720 configured to wind the wire 710, and a drive motor 730 configured to drive the winding unit 720.

The fastening plate 800 is coupled to a side surface of the movable body, and an elongated hole is formed in the fastening plate 800 in the longitudinal direction of the fastening plate 800. Through holes are formed through each of the guide lines 900 at predetermined intervals. One of the through holes and the elongated hole of the fastening plate 800 are coupled by a locking member so that the movable body 600 is fastened onto the guide rails 400 and 450.

Next, cargo box doors 150 formed through the side surfaces of the cargo box are means by whether or not cargo is present inside the cargo box can be determined, and enable a situation inside the cargo box to be checked even when a user does not directly enter the cargo box. Furthermore, a user may enter the inside of the cargo box, and may operate a fastening bolt 810 configured to fasten the movable body 600 and the fastening plate 800 to each other and the locking member 910 configured to fasten the fastening plate 800 and the first guide rails 400 to each other.

It will be apparent that the present invention may be applied to the above-described embodiment and may be also applied to the following various embodiments.

Figure 2:
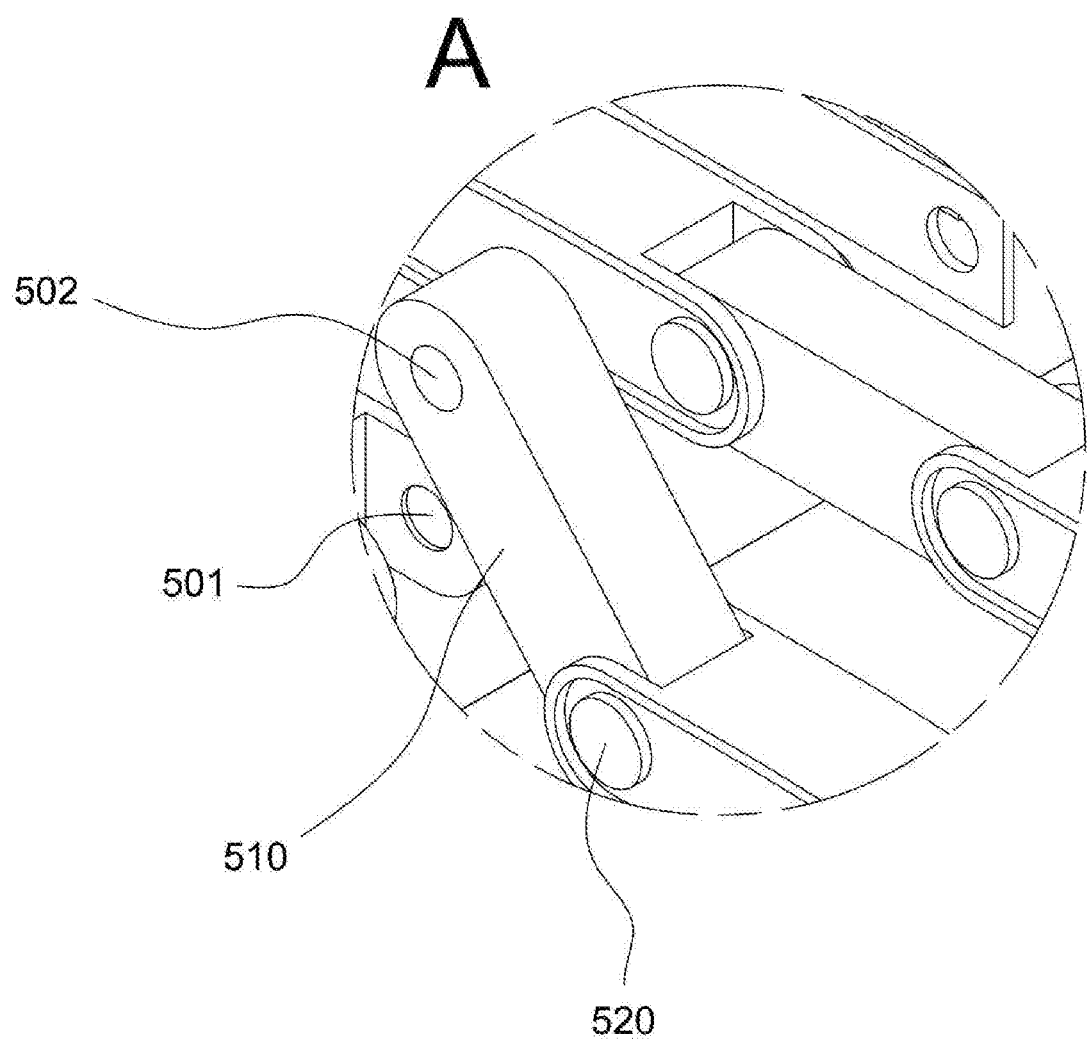
FIG. 2 is an enlarged view showing a connection means according to the present invention.

FIG. 2 is an enlarged view showing the connection means according to the present invention.

As shown in FIG. 2, the connection means 500 includes a connection body 510, a first through hole 501 formed at an end of a corresponding one of the first guide rails 400, and a third through hole (not shown) formed at an end of a corresponding one of the second guide rails 450. A second through hole 502 is formed at one end of the connection body 510 at a location corresponding to the first through hole 501. A coupling pin (not shown) passes through the first through hole 501 and the second through hole 502 and thus performs fastening.

A fourth through hole (not shown) is formed at the other end of the connection body 510 at a location corresponding to the third through hole. A coupling pin 520 passes through the third through hole and the fourth through hole and thus performs fastening.

Figure 3:
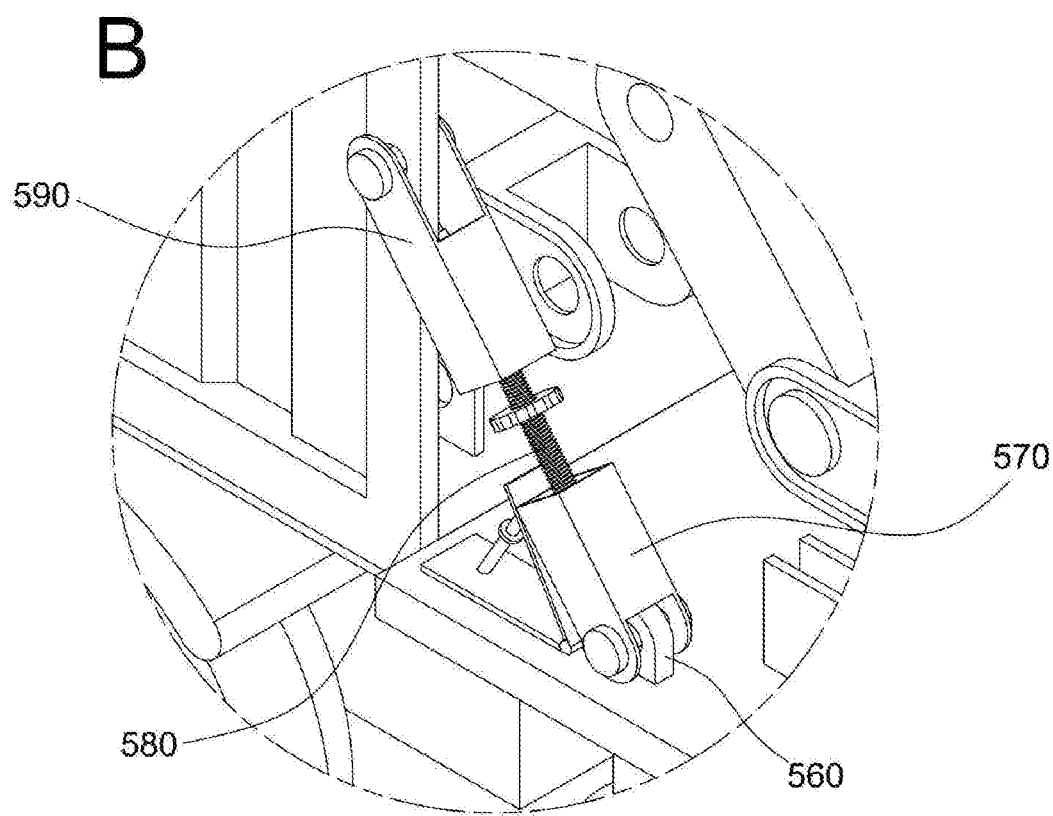
FIG. 3 is an enlarged view showing a fastening means according to the present invention.
Figure 4:
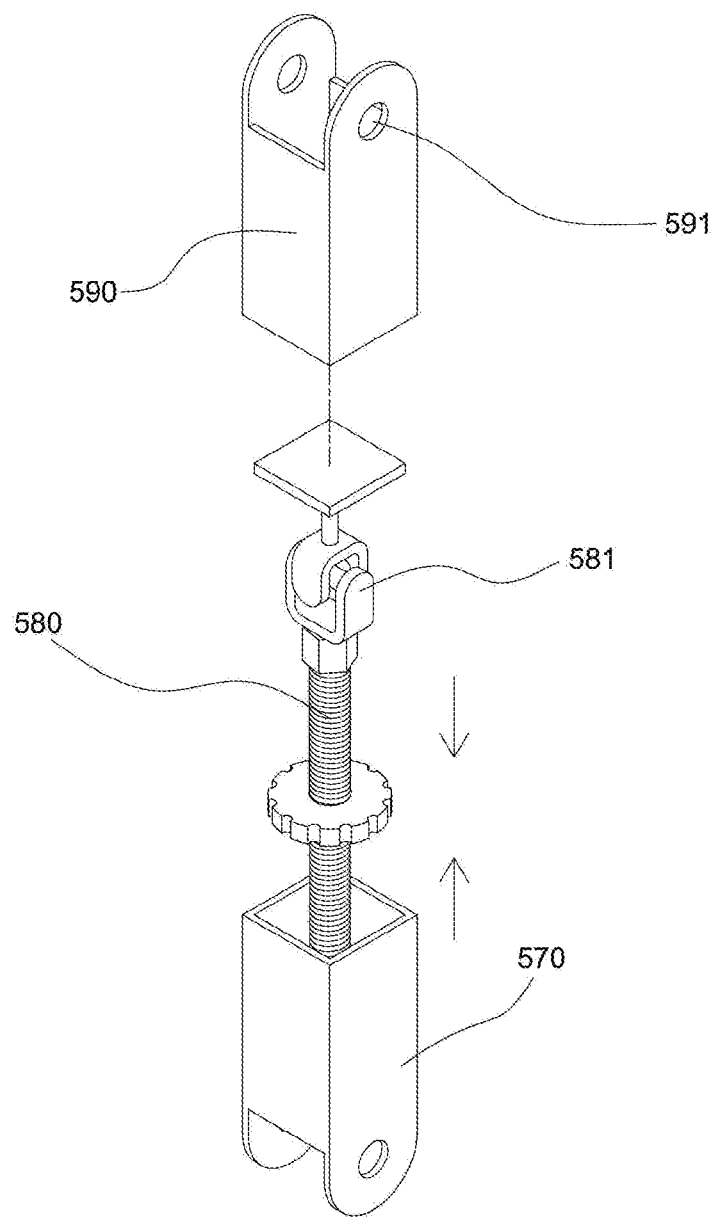
FIG. 4 is an exploded view showing a fastening means according to the present invention.

Next, as shown in the above-described drawings and FIGS. 3 and 4, the fastening means includes a fastening ring 560 configured to be attached to an end of the support plate 300, a first fastening rod 570 configured to be hinged to the fastening ring 560, a turnbuckle 580 configured such that one end thereof is coupled to the inside of the first fastening rod 570, a universal joint 581 coupled to the other end of the turnbuckle 580, and a second fastening rod 590 configured such that it accommodates and engages with the universal joint 581 therein and a through hole 591 is formed at an end thereof.

The fastening ring 560 and the first fastening rod 570 are hinged to each other, and can adjust the angle at which coupling to the cargo box of the transportation means is performed. The turnbuckle 580 may adjust the distance over which the transportation means and the support plate 300 are coupled to each other. The universal joint 581 which is coupled to the other end of the turnbuckle 580 functions to minimize a change in the angle at which the cargo box and the support plate 300 are coupled to each other and a change in rotating force which are caused by the load of cargo placed on the top of the movable body 600 when the movable body 600 is moving along the first guide rails 400 and the second guide rails 450.

Furthermore, a fastening pin passes through a through hole 591 formed at an end of the second fastening rod 590 and a through hole formed in the cargo box so as to correspond to the through hole 591 and thus performs fastening.

Figure 5:
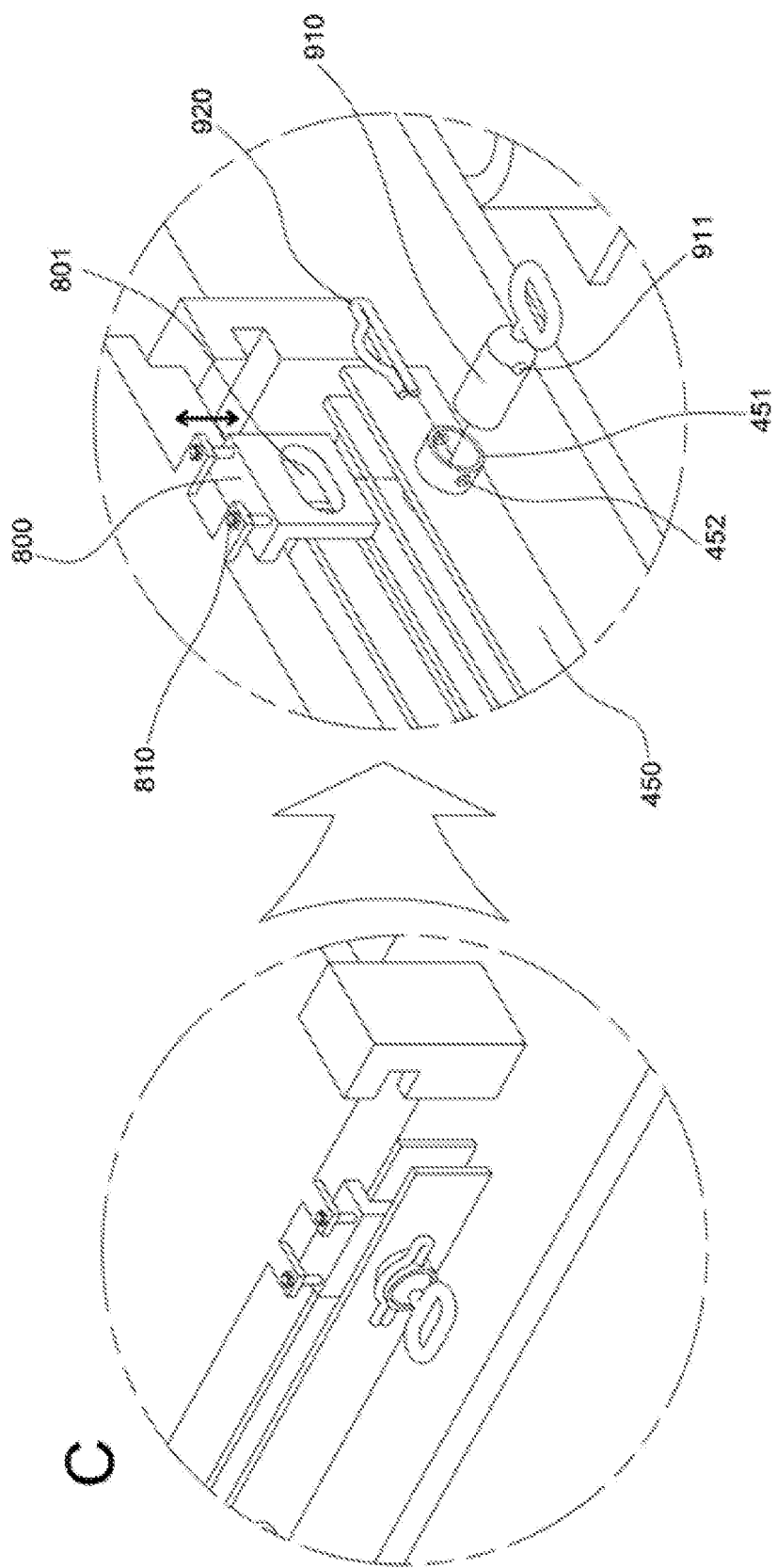
FIG. 5 is an enlarged view showing a fastening plate and a locking member according to the present invention.

As shown in FIG. 5, a fastening hole is formed in one side of the fastening plate 800, the fastening plate 800 is coupled to a side surface of the movable body 600 via fastening bolts 810, and the elongated hole 801 is formed in the fastening plate 800 in the longitudinal direction of the fastening plate 800 so as to accommodate the locking member 910. The fastening bolts 810 adjust the length over which the movable body 600 and the fastening plate 800 are coupled through tightening.

The guide lines 900 are disposed beside the second guide rails 450. Fastening members 451 configured to accommodate the locking member 910 protrude in a predetermined arrangement so as to correspond to the elongated hole 801. A first fastening pin hole 452 configured such that a fastening pin 920 is fitted thereinto is formed through the side surface of each of the fastening members 451. The locking member 910 passes through the elongated hole 801 and the fastening member 451 and thus performs fastening. A second fastening pin hole 911 corresponding to the first fastening pin hole 452 is formed through the side surface of the locking member 910, and thus the fastening pin 920 passes through the first fastening pin hole 452 and the second fastening pin hole 911 and thus performs fastening.

Accordingly, the locking member 910 fastens the movable body 600 onto the second guide rails 450, and thus prevents movement when cargo is placed on or removed from the movable body 600.

Figure 6:
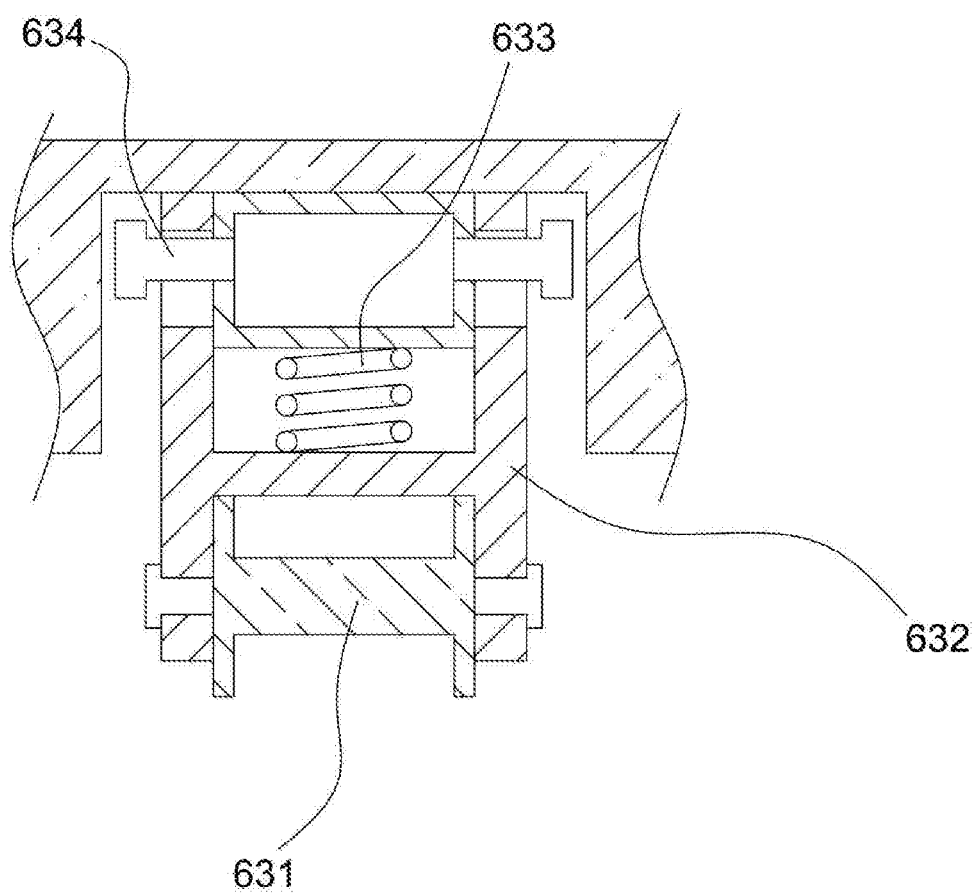
FIG. 6 is a sectional view showing a driving roller according to the present invention.

Furthermore, the movable body 600 is provided with the driving rollers on the bottom thereof and, thus, can smoothly move along the first guide rails 400 and the second guide rails 450. As shown in FIG. 6, the driving roller includes a driving wheel 631 configured to roll along the guide rail 400 or 450, a plate 632 coupled to the top of the driving wheel 631, an elasticity means 633 disposed inside the plate 632, and a close contact pin 634 configured to come into close contact with the lower end of the movable body 600 and the upper end of the plate 632.

Figure 7:
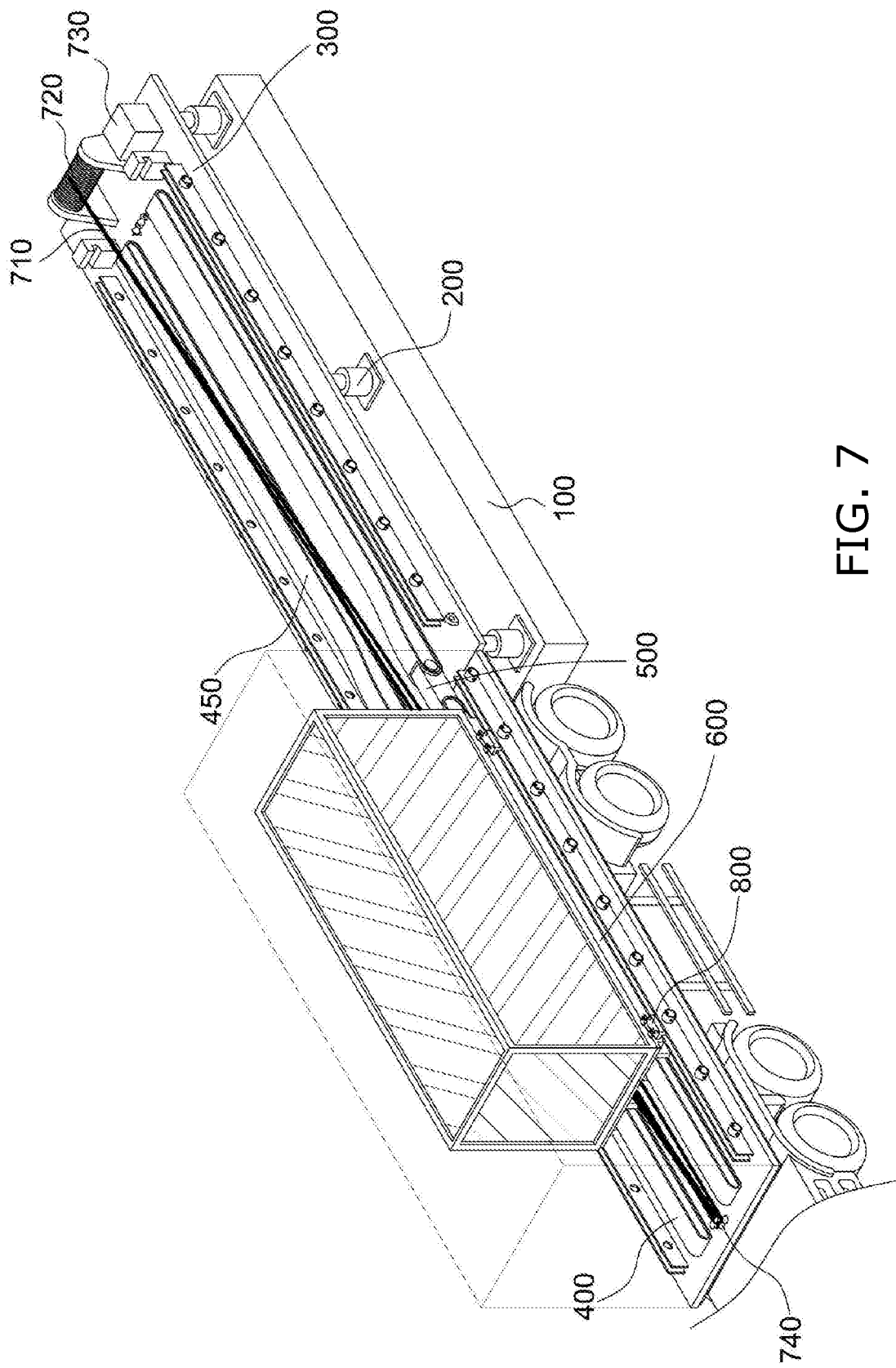
FIG. 7 is a perspective view showing another embodiment to which a cargo loading system according to the present invention is applied.

As another embodiment of the present invention, FIG. 7 is a view showing a process in which cargo is placed on the top of the movable body 600 and the movable body 600 located on the second guide rails 450 is moved to the first guide rails 400.

When a user wants to load cargo into a cargo box by using the cargo loading system of the present invention, the wire 710 wound on the winding unit 720 is connected to one side of the movable body 600 through the rotating shaft 740 disposed on the front sides of the first guide rails 400. The wire 710 is wound on the winding unit 720 by operating the drive motor 730 disposed adjacent to the winding unit 720, and thus the movable body 600 is moved into the cargo box.

Thereafter, when the movable body 600 is moved to an appropriate location, second guide lines are formed adjacent to the first guide rails 400 so as to correspond to the guide lines 900, the movable body 600 is fastened inside a control box by using the above-described locking member 910 and fastening plate 800, and the connection between the wire 710 and the movable body 600 is released.

In other words, even when the transportation means transports the cargo loaded into the cargo box, the cargo is fastened inside the cargo box and, thus, can be securely transported.

Figure 8:
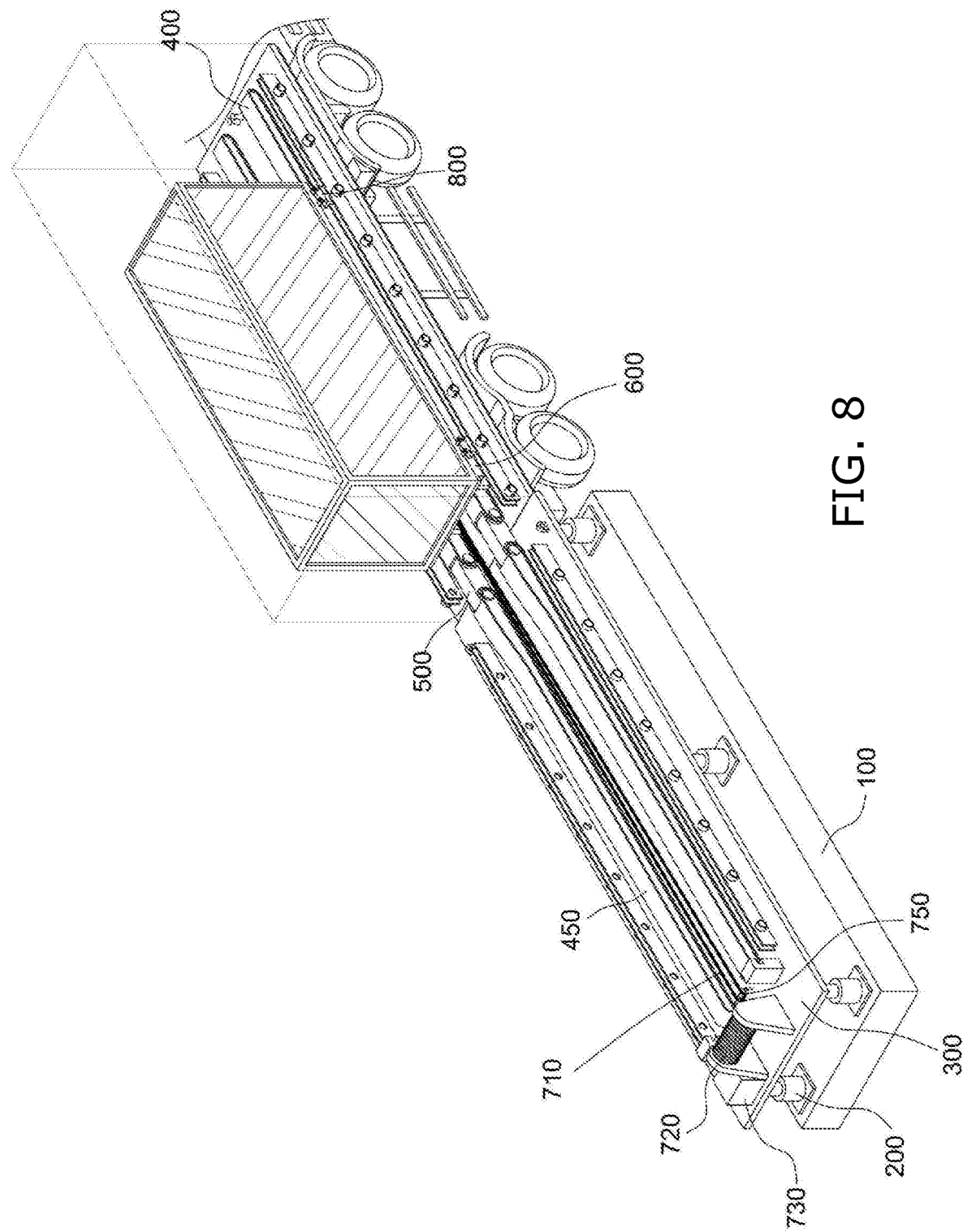
FIG. 8 is a perspective view showing still another embodiment to which a cargo loading system according to the present invention is applied.

Furthermore, when a user wants to unload cargo from the inside of the cargo box to the outside by using the cargo loading system of the present invention, the wire 710 wound on the winding unit 720 is connected to one side of the movable body 600 through a guide shaft 750 disposed on the rear side of the second guide rails 450, as shown in FIG. 8. The wire 710 is wound on the winding unit 720 by operating the drive motor 730 disposed adjacent to the winding unit 720, and thus the movable body 600 is moved from the inside of the cargo box to the outside.

In this case, when the movable body 600 is moved to an appropriate location, the movable body 600 is fastened by coupling the locking member 910 to the guide lines 900 and the fastening plate 800, the connection between the wire 710 and the movable body 600 is released, and then cargo placed on the movable body 600 is unloaded.

Figure 9:
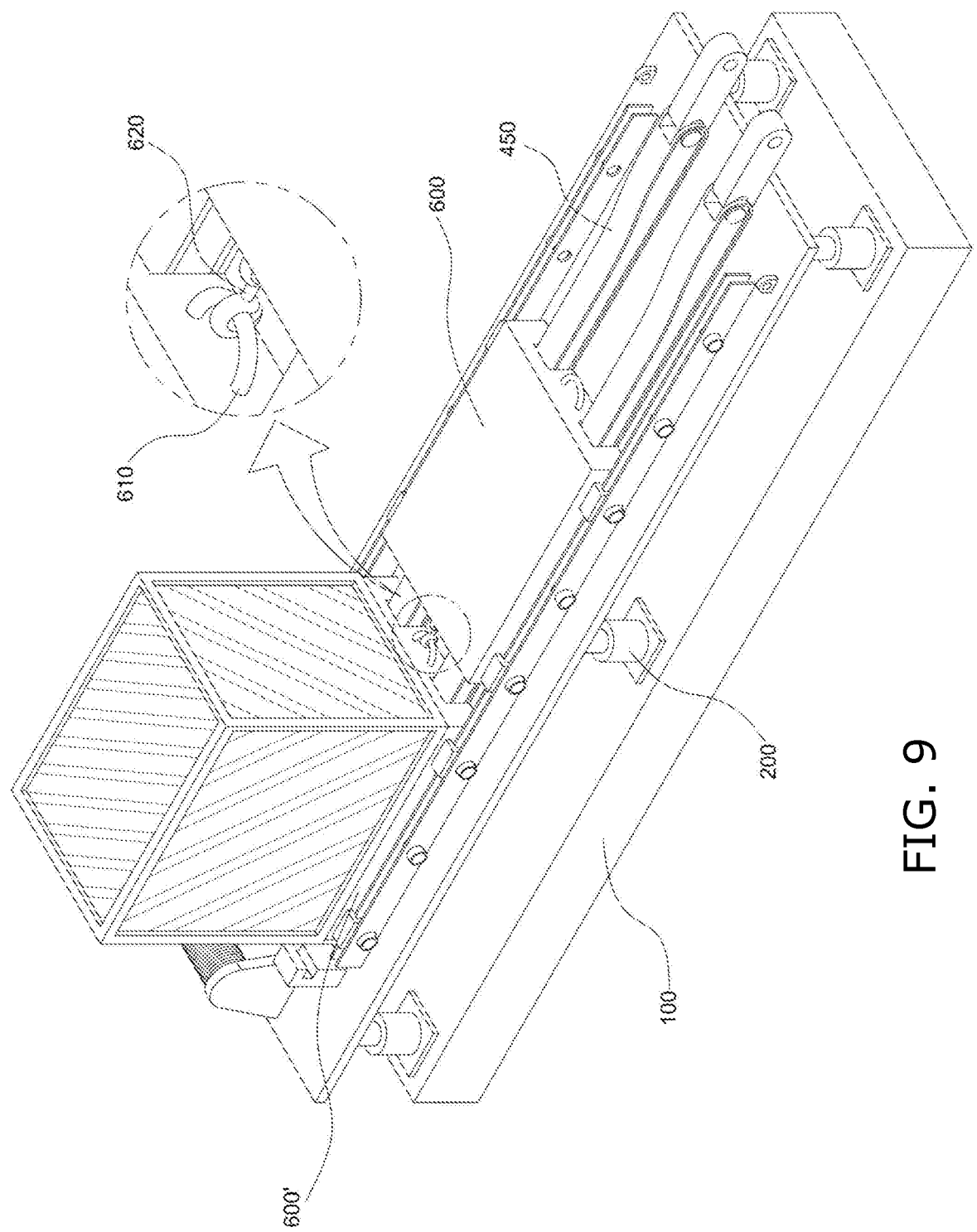
FIG. 9 is a perspective view showing another embodiment of a movable body according to the present invention.

Furthermore, in some cases, an auxiliary movable body 600" may be installed in addition to the movable body 600. As shown in FIG. 9, when the auxiliary movable body 600" is installed, cargo can be moved and loaded without difficulty even in a case where the size of cargo is large or a case where the size of cargo is small and the cargo includes a plurality of pieces of cargo. Connection rings 610 are formed on opposite side surfaces of the movable body 600 and the auxiliary movable body 600," and are connected by a connection member 620. Furthermore, although not shown in the drawings, the frame 100 may be installed on a side surface of a loading part and then cargo may be loaded into and unloaded from a cargo box in the case of the loading part in which entrances are formed not only on its rear side but also on its side surface. Additionally, the above-described configuration may be applied not only to the cargo box of a transportation means but also to the bottom of a general transportation vehicle, a container, a warehouse, or the like.

It will be apparent that the present invention is not limited to the above-described embodiments, application ranges are various, and various modifications may be made without departing from the gist of the present invention claimed in the attached claims.

The invention claimed is:

1. A cargo loading system comprising:
    a frame which is installed on a ground surface;
    a plurality of height adjustment means which is formed on a top surface of the frame;
    a support plate which is disposed on tops of the plurality of height adjustment means;
    a second guide rail which is disposed on a top surface of the support plate so as to correspond to a first guide rail formed on a loading part of a transportation means;
    a connection means which is disposed at an end of the second guide rail and connects an end of the first guide rail;
    a fastening means which is disposed on a front side of the support plate and is coupled to an end of the loading part;
    a movable body which is provided with driving rollers on a bottom thereof so that it can move along the first guide rail and the second guide rail and is loaded with cargo on a top thereof;
    a drive means which is disposed on a rear side of the support plate so as to move the movable body along the first guide rail and the second guide rail and includes a wire configured to be connected to one side of the movable body, a winding unit configured to wind the wire, and a drive motor configured to drive the winding unit;
    a fastening plate which is disposed on the movable body; and
    a guide line which is disposed adjacent to the second guide rail so as to be coupled to the fastening plate through a locking member.

2. The cargo loading system of claim 1, wherein a front side of the second guide rail is formed as an inclined surface which rises gradually.

3. The cargo loading system of claim 1, wherein the connection means comprises a coupling pin configured to pass through a first through hole formed at an end of the first guide rail and a second through hole formed at one end of the connection body and thus performs fastening, and a coupling pin configured to pass through a third through hole formed at an end of the second guide rail and a fourth through hole formed at a remaining end of the connection body and thus performs fastening.

4. The cargo loading system of claim 1, wherein the fastening means comprises a fastening ring configured to be attached to an end of the support plate, a first fastening rod configured to be hinged to the fastening ring, a turnbuckle configured such that universal joints are coupled to both ends thereof and one end thereof is coupled to the first fastening rod, and a second fastening rod configured such that a remaining end of the turnbuckle is coupled thereto and a through hole is formed at an end thereof.

5. The cargo loading system of claim 1, wherein:
    the fastening plate is provided with a fastening hole and coupled to a side surface of the movable body via a fastening bolt, and is provided with an elongated hole in a longitudinal direction thereof so that the locking member can be accommodated in the elongated hole;
    fastening members protrude from a side surface of the guide line in a predetermined arrangement so as to accommodate the locking member, and a first fastening pin hole configured such that a fastening pin is coupled thereinto is formed through a side surface of each of the fastening members; and
    the locking member passes through the elongated hole and the fastening member, a second fastening pin hole corresponding to the first fastening pin hole is formed through a side surface of the locking member, and the fastening pin passes through the holes and thus performs fastening.

6. The cargo loading system of claim 1, wherein the drive means is configured such that a rotating shaft is disposed adjacent to the first guide rail, a guide shaft is disposed adjacent to the second guide rail, and the wire is connected to one side of the movable body via the guide shaft and the rotating shaft.

* * * * *